S. R. McKAY.
VEHICLE WHEEL.
APPLICATION FILED MAR. 12, 1917.
1,326,678.  Patented Dec. 30, 1919.
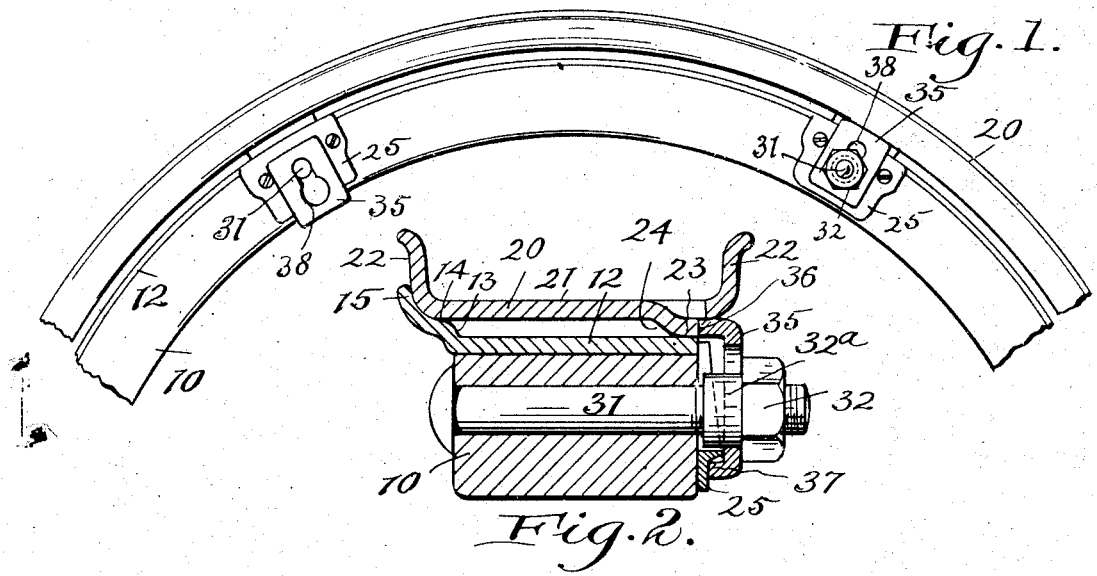
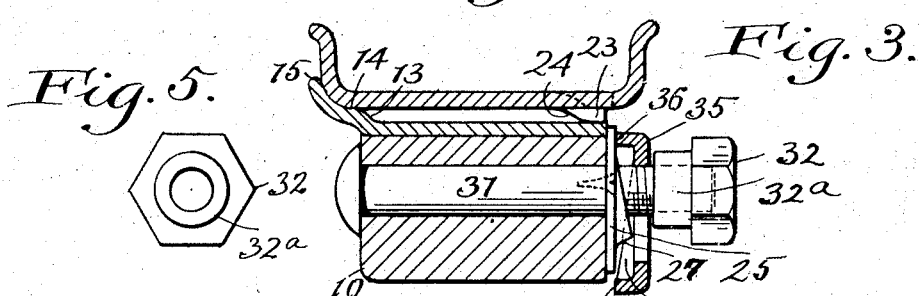
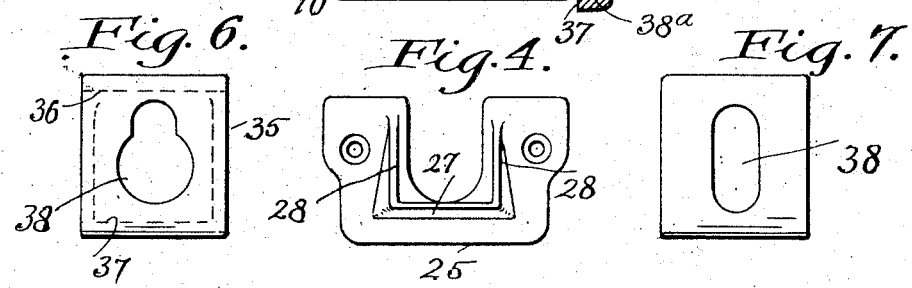
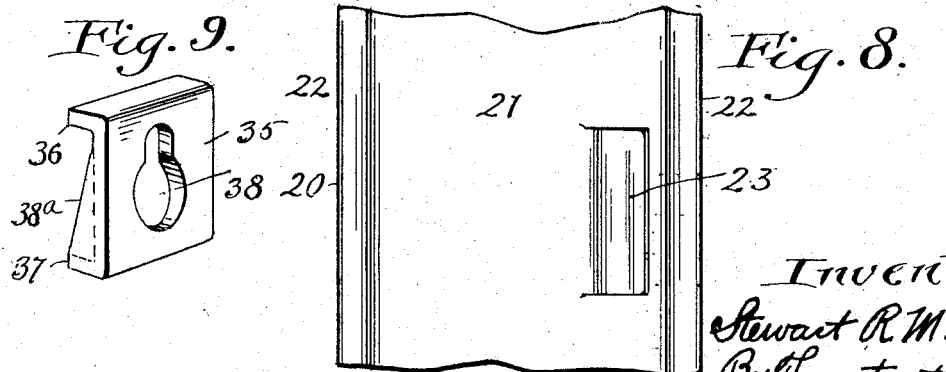
Inventor.
Stewart R. McKay
By Thurston & Rice
attys.

UNITED STATES PATENT OFFICE.

STEWART R. McKAY, OF CLEVELAND, OHIO, ASSIGNOR TO THE McKAY COMPANY, OF CLEVELAND, OHIO, A CORPORATION OF OHIO.

VEHICLE-WHEEL.

1,326,678.  Specification of Letters Patent.  Patented Dec. 30, 1919.

Application filed March 12, 1917. Serial No. 154,091.

*To all whom it may concern:*

Be it known that I, STEWART R. McKAY, a citizen of the United States, residing at Cleveland, in the county of Cuyahoga and State of Ohio, have invented a certain new and useful Improvement in Vehicle-Wheels, of which the following is a full, clear, and exact description.

The object of this invention is to provide a vehicle wheel with a demountable rim and locking devices therefor, all at reasonable cost, and so constructed that the rim may be easily removed from and applied to the wheel, and accurately centered thereon, and then so secured that there will be no tendency to distort the rim through the action thereon of the locking devices.

The invention consists in the construction and combination of parts shown in the drawings and hereinafter described and pointed out definitely in the appended claims.

In the drawings, Figure 1 is a front, *i. e.* an outside elevation of a segment of a wheel equipped with the present invention. Fig. 2 is a radial section through the felly, felly band, rim and one of the rim locking mechanisms when said locking mechanisms are in position to hold the rim on the wheel. Fig. 3 is a similar section when the locking mechanisms are in position to permit the removal of the rim from the wheel; Fig. 4 is an outside view of the wear plate associated with locking mechanism; Fig. 5 is an end view of the nut shown in Figs. 2 and 3; Fig. 6 is an outside view of the clamp shown in Figs. 2 and 3; Fig. 7 is an outside view of a slightly different form of clamp, with which an ordinary nut may be used; Fig. 8 is an inside view of a short section of the rim; Fig. 9 is a perspective rear view of a clamp.

Referring to the parts by reference characters, 10 represents the felly of the wheel; 12 the felly band, and 20 the rim. 25 represents one of the wear plates, which is fixed to the outer side of the felly. 31 represents one of the locking bolts; 32 a nut therefor; and 35 represents one of the outside rim clamps.

The felly band 12 is an annulus which is fitted to and secured on the felly. The felly band is bent near its rear edge to form the narrow outwardly inclined conical zone 12, the narrow cylindrical zone 14, and, at the extreme rear edge, the outwardly extended rear rim-clamping flange 15.

The rim 20 is of well known shape, having an annular cylindrical base 21, and two outwardly bent side flanges 22 of suitable shape for engagement with the tire casing, for which the rim is designed. The interior diameter of the base portion of the rim is such that it will fit loosely over the cylindrical zone 14 of the felly band, and will therefore be at a slight distance away from the outer periphery of the main part of said felly band.

A plurality of equally spaced tongues 23 are punched inward from the base of the rim adjacent its outer edge. These tongues remain attached at their rear ends to the rim; but their front ends are bent inward so that they may engage the outer surface of the felly band. The extreme ends of these tongues serve as shoulders for the engagement of the clamp 35; and the rear faces 24 of the downwardly bent parts of said tongues are inclined as shown.

When one is putting this rim on the wheel, he will push the rim rearwardly, *i. e.* toward the vehicle body, causing the inner edge of the rim to engage the conical zone 13 on the felly band, whereby the rim will be guided onto the cylindrical zone 14 of said felly, thus centering the rear part of the rim with respect to the wheel. At the same time the beveled parts 24 of the tongues 23 will engage the front edge of the felly band and guide the tongues onto the same, thereby bringing the front part of said rim into centered relation with respect to the wheel. These rims are commonly of steel, and therefore the tongues 23 will be slightly resilient,—wherefore they may fit tightly upon the felly band, although this is not essential.

It is only after the rim has been moved rearward on the wheel to the extent specified, and has thereby become accurately centered, both front and rear, with respect to the wheel, that the locking devices should be or can be brought to a functioning position.

Each locking plate 35 has, adjacent its outer edge, a rearwardly bent flange 36, which, when the clamp is in the operative position, will engage the end of a tongue 23. This locking plate has also adjacent its inner edge a rearwardly turned flange 37 for engagement with the front face of the wear plate 25, and a flange 27 thereon.

This wear plate has, just outside of this flange 37, a forwardly projecting rib 27 which, by engaging the flange 37, will limit the outward radial movement of the clamp 35 with respect to the wheel. As before stated, the bolt 30 passes through a slot 38 in this clamp; and the nut 32 screwed onto the projecting end of the bolt against this clamp, which is thereby pushed rearward. The rear face of the flange 37 engages with the wear plate and the rear face of the flange 36 engages the front end of the associated tongue 23, and thereby the rim is held in the position stated and is clamped between the clamp 35 and the rear clamping flange 15, at regular intervals around the wheel.

It will be noted that the outer flange 36 of the clamp 35 will when this clamp is in operative position overhang and engage the outer end of the associated wear plate, and this will prevent any possible radial inward movement of the clamp out of operative position with respect to the associated tongue 23.

As an additional precaution against any radial inward movement of this clamp away from the operative position, the slot 38 may be enlarged as shown in Fig. 6; and the nut 32 may be formed on its rear face with a cylindrical boss 32ª which enters and substantially fits the enlarged portion of the slot, and thereby as stated prevents radial inward movement of the clamp. The clamps would, however, be operative if the slot 38 were of substantially uniform width from top to bottom, as shown in Fig. 7. In that event an ordinary nut could be employed in place of the nut shown in Figs. 2, 3 and 5, which as stated is provided with the cylindrical boss on its rear end.

From the foregoing it is apparent that the clamping devices have nothing whatever to do with the centering of the rim upon the wheel. The rim is so centered primarily by the engagement of the rim with the cylindrical zone 14 on the felly band; and probably that in most cases the rim would be centered with sufficient accuracy by this engagement, even if the tongues 23 did not also engage the felly band, and that it would remain so centered when the clamps were tightened, if as in the present construction, the tightening of the clamps could not act to thrust the rim radially outward. The engagement of the flange 37 on the clamp with the rib 27 on the wear plate will prevent any bodily movement radially outward of the clamp as it is being tightened; and it also helps to prevent the clamp from turning as it otherwise might be caused to turn by friction from the nut as the latter is being screwed onto the bolt. To make it entirely certain that the clamp shall not turn on the bolt, the wear plate is formed with two ribs 28, which are substantially radial, and the clamps are formed with two rearwardly extended flanges 38 at their side edges for engagement with the ribs 38.

Having described my invention, I claim:—

1. The combination of a wheel, a felly band thereon having an outwardly extended rear clamping flange, a tire holding rim adapted when in operative position to engage said rim clamping flange, a plurality of front clamps mounted on the felly of the wheel for engagement with said rim, wear plates secured to the felly between it and the several clamps,—each wear plate having an outwardly extended rib, and each associated clamp having adjacent its inner end a rearwardly extended flange 37 adapted to engage the wear plate and the inner end of the rib thereon, and means engaging each clamp to drive it in the rim clamping direction.

2. The combination of a wheel, a felly band secured thereon which felly band adjacent its rear edge is bent outward to form a conical zone, and behind that a short cylindrical zone, and at the extreme rear edge a rim clamping flange, a rim for holding the tire, which rim is formed with a plurality of tongues punched inward from the base portion of said rim,—each tongue being integrally attached at its rear end and being bent inward adjacent said point of attachment at an angle to a position such that the inner face of said tongue adjacent its free end may engage the outer periphery of the felly band and such as will present the front end of said tongue for engagement by a clamp, a clamp for each tongue each clamp having at its outer end a rearwardly extended flange which will engage the free end of the associated tongue and will overhang a part fixed to the felly, and means for driving said clamp in the rim clamping direction.

In testimony whereof, I hereunto affix my signature.

STEWART R. McKAY.